US011122332B2

(12) United States Patent
Dang et al.

(10) Patent No.: US 11,122,332 B2
(45) Date of Patent: Sep. 14, 2021

(54) SELECTIVE VIDEO WATCHING BY ANALYZING USER BEHAVIOR AND VIDEO CONTENT

(71) Applicant: INTERNATIONAL BUSINESS MACHINES CORPORATION, Armonk, NY (US)

(72) Inventors: Feng Rong Dang, Shanghai (CN); Yun Han Li, Shanghai (CN); Zheng Luan Liu, Shanghai (CN); Ya Qing Chen, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/663,483

(22) Filed: Oct. 25, 2019

(65) Prior Publication Data

US 2021/0127165 A1 Apr. 29, 2021

(51) Int. Cl.
*H04N 21/466* (2011.01)
*G06F 16/735* (2019.01)
*G06F 16/74* (2019.01)
*G06N 3/08* (2006.01)
*H04N 21/44* (2011.01)
*H04N 21/8405* (2011.01)
(Continued)

(52) U.S. Cl.
CPC ....... *H04N 21/4662* (2013.01); *G06F 16/735* (2019.01); *G06F 16/74* (2019.01); *G06N 3/08* (2013.01); *H04N 21/44008* (2013.01); *H04N 21/44222* (2013.01); *H04N 21/4532* (2013.01); *H04N 21/4668* (2013.01); *H04N 21/8405* (2013.01)

(58) Field of Classification Search
None
See application file for complete search history.

(56) References Cited

U.S. PATENT DOCUMENTS 7,640,272 B2 12/2009 Mahajan et al.
8,832,753 B2 9/2014 Andrade et al.
(Continued)

FOREIGN PATENT DOCUMENTS

CN 105228013 * 9/2018 ..... H04N 21/440236

OTHER PUBLICATIONS

Liu et al., "Research of Barrage Analysis Based on Hypernetwork", CISP-BMEI, IEEE, Oct. 13-15, 2018 (Year: 2018).*
(Continued)

*Primary Examiner* — James R Marandi
(74) *Attorney, Agent, or Firm* — Cantor Colburn LLP; Teddi Maranzano

(57) ABSTRACT

Aspects of the invention include selective video-watching by analyzing user behavior and video content. A non-limiting example computer-implemented method includes playing, by a processor, a target video with a pre-fetched frame. The method extracts, by the processor, a feature from the pre-fetched frame and stores, by the processor, the feature in a repository. The method provides, by the processor, a plurality of actions to a target user based on the feature stored in the repository. The method receives, by the processor, one of the plurality of actions from the target user; and performs, by the processor, the one of the plurality of actions received from the target user.

20 Claims, 9 Drawing Sheets

(51) Int. Cl.
  *H04N 21/45*     (2011.01)
  *H04N 21/442*    (2011.01)

(56) References Cited

U.S. PATENT DOCUMENTS

| | | | |
|---|---|---|---|
| 9,858,967 B1 | 1/2018 | Nomula et al. | |
| 10,038,942 B2 | 7/2018 | Chen et al. | |
| 10,080,042 B1 | 9/2018 | Gargi et al. | |
| 2002/0097983 A1 | 7/2002 | Wallace et al. | |
| 2003/0093790 A1* | 5/2003 | Logan | G11B 27/34 |
| | | | 725/38 |
| 2004/0221322 A1 | 11/2004 | Shen et al. | |
| 2013/0151728 A1* | 6/2013 | Currier | H04N 21/4126 |
| | | | 709/248 |
| 2016/0154887 A1* | 6/2016 | Zhao | G06F 16/4387 |
| | | | 707/727 |
| 2017/0006252 A1* | 1/2017 | Patel | G11B 27/005 |
| 2019/0303499 A1* | 10/2019 | Sharma | G06F 16/7837 |
| 2019/0373322 A1* | 12/2019 | Rojas-Echenique | |
| | | | G06N 3/0454 |

OTHER PUBLICATIONS

Luthra et al., "A Machine Learning based Approach to Video Summarization," Indian Institute of Technology, IBM India Research Lab, 2008, 5p.

Mell et al., "The NIST Definition of Cloud Computing," NIST, Recommendations of the National Institute of Standards and Technology, Sep. 2011, 7p.

\* cited by examiner

300

|  | Video 1 | Video 2 | Video 3 | ... | Video i |
|---|---|---|---|---|---|
| User 1 | 0 | 1 | 1 |  | 1 |
| User 2 | 1 | 1 | 1 |  | 0 |
| ... |  |  |  |  |  |
| User j | 0 | 0 | 1 |  | 0 |

|  | User 1 | User 2 | User 3 | User 4 | User 5 |
|---|---|---|---|---|---|
| Video 1 | Sim 1 | 0 | Sim 3 | 0 | Sim 5 |
| Video 2 | 0 | Sim 2 | 0 | Sim 4 | 0 |
| ... | | | | | |
| Video u (u<=i) | Sim 1 | Sim 2 | Sim 3 | Sim 4 | Sim 5 |

|  | User 1 | User 2 | User 3 | User 4 | User 5 |
|---|---|---|---|---|---|
| Video 1 | {Feature 1, Feature 2, ... feature k} | 0 | {Feature 1, Feature 2, ... feature k} | 0 | {Feature 1, Feature 2, ... feature k} |
| Video 2 | 0 | {Feature 1, Feature 2, ... feature k} | 0 | {Feature 1, Feature 2, ... feature k} | 0 |
| ... | | | | | |
| Video u (u<=i) | {Feature 1, Feature 2, ... feature k} | {Feature 1, Feature 2, ... feature k} | {Feature 1, Feature 2, ... feature k} | {Feature 1, Feature 2, ... feature k} | {Feature 1, Feature 2, ... feature k} |

|  | Feature 1 | Feature 2 | Feature 3 | ... | Feature f |
|---|---|---|---|---|---|
| Video 1 | (Sim1+sim3) * S1 | (Sim1+ sim 5) * S1 | Sim 3 * S1 | ... | (Sim1 + sim 3 + sim 5)*S1 |
| Video 2 | 0*S2 | (Sim 2 + sim 4)*S2 | 0*S2 | ... | Sim 4 * S2 |
| ... | | | | | |
| Video u (u<=i) | (Sim 1+ sim 2+ sim 3) * Su | (Sim 2 + sim 3 + sim 4) * Su | (Sim 4+ sim 5) * Su | ... | 0* Su |

FIG. 6

SELECTIVE VIDEO WATCHING BY ANALYZING USER BEHAVIOR AND VIDEO CONTENT

BACKGROUND

The present invention generally relates to streaming video, and more specifically, to selective video watching by analyzing user behavior and video content.

Video streaming is ever increasing in popularity. Viewers often only want to watch particular scenes in a video and must drag a progress bar to skip to certain times in the video that correspond to the particular scenes. This must be repeated for each segment of video that a viewer wishes to watch.

SUMMARY

Embodiments of the present invention are directed to selective video watching by analyzing user behavior and video content. A non-limiting example computer-implemented method includes playing, by a processor, a target video with a pre-fetched frame. The method extracts, by the processor, a feature from the pre-fetched frame and stores, by the processor, the feature in a repository. The method provides, by the processor, a plurality of actions to a target user based on the feature stored in the repository. The method receives, by the processor, one of the plurality of actions from the target user; and performs, by the processor, the one of the plurality of actions received from the target user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 illustrates a table of users and watched videos in accordance with one or more embodiments of the present invention;

FIG. 4 illustrates a similarity table of users and videos in accordance with one or more embodiments of the present invention;

FIG. 5 illustrates a feature table of users and watched videos in accordance with one or more embodiments of the present invention;

FIG. 6 illustrates a weighted feature table of users and watched videos in accordance with one or more embodiments of the present invention;

Figure 1:
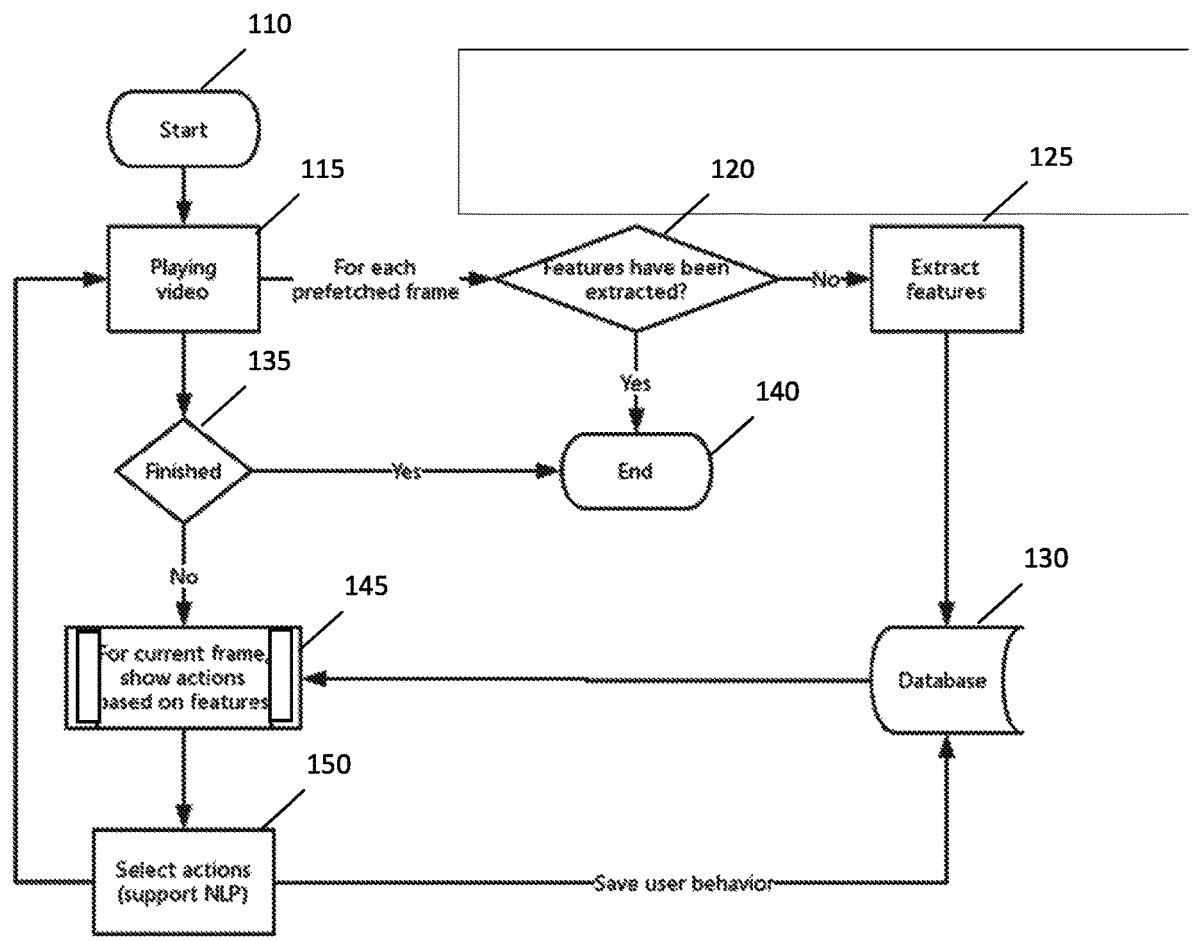
FIG. 1 illustrates a flowchart of an extraction and playback process in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a selective video watching system and method that analyzes user behavior, including skipping video frames and reading barrage comments, in order to readily provide a location of specific episodes, people in the video, key words, and/or context. Through this system and method, a viewer can view only necessary plot points without the need for any manual input from the user.

A term used several times herein is "barrages." A barrage is text input by a user when watching a particular scene in a video. It serves as a sort of annotation of the action, characters, or actors in a scene.

Sometimes, people would like to skip the plots they don't like or only view the most pertinent episodes when watching a video in order to digest the plot of a movie or episodic television show or movie series. At present, however, viewers have to drag the progress bar manually to skip to a certain time anchor again and again. This imposes not only manual efforts, but users can easily miss some plots accidentally.

One or more embodiments of the present invention provide technological improvements over current methods of viewing videos that require manual input and dragging or selection in order to watch certain scenes or plot points in a video or sequence of videos. Disadvantages of contemporary approaches may include the need for manual input and the risk of missing key plot points. One or more embodiments of the present invention provide technical solutions to one or more of these disadvantages of existing solutions by providing a selective video-watching system and method to support analysis of user behavior (e.g., the skip behavior and barrages, and/or comments input from users regarding a particular scene) and the video content through artificial intelligence technologies such as image recognition and semantic analysis.

The method detects whether a pre-fetched/cached frame to be watched by the user will be skipped by calculating the similarity between a feature set extracted from the pre-fetched frame and a feature set calculated based on a large amount of history data collected from similar users who watch similar videos. This includes analysis of the video currently being watched by the target user (known as the target video) and the history and real-time data from the target user watching the target video. Once the system determines what plots/frames the user wants to skip, it prompts the user with an option list providing different actions to take against the to-be-skipped plots or frames. The user selects an action. The system saves the user's behavior data, including skipping and barrages, to the database.

The method helps people quickly locate scenes that feature specific people or key words, for example, and view only the plots she wants to watch without manual adjustment by herself, hence providing a better watching experience for online users.

For example, if a user wants to watch a long television series but has insufficient time, she can watch the episodes she likes all together instead of in fragmented clips. Another scenario is a video tutorial. This method can learn the skill level/background knowledge of users and filter or customize the episodes automatically, saving a lot of time in listening to what the user has already known.

Turning now to FIG. 1, a flowchart is generally shown in accordance with one or more embodiments of the present invention. To start (block 110), a video is playing (block 115). For each pre-fetched frame in the video, a check is performed to see if all of the features of the video have been extracted (block 120). Features include, for example, who is in the frame, where is the setting of the frame, what is the subject matter of the frame. If all of the features have been extracted, processing ends (block 140). If all of the features have not been extracted, features are extracted from the video using deep learning technology (block 125). The deep learning can be by deep neural networks, deep belief networks, recurrent neural network, or convolutional neural networks, for example. The extracted features are stored in a repository (block 130).

If the video has finished being played (block 135), the extraction process is completed (block 140). If the video continues to be played (block 135), for the current frame, possible user actions are shown based on the extracted features for the frame being shown (block 145). Possible actions include, for example: skipping manually to a next target anchor that is shown on a progress bar; enabling the video to skip intelligently to the next target anchor with brief verbiage to describe any skipped plot points; or enabling the video to be played at a higher speed. The user then selects one of the potential actions (block 150).

Figure 2:
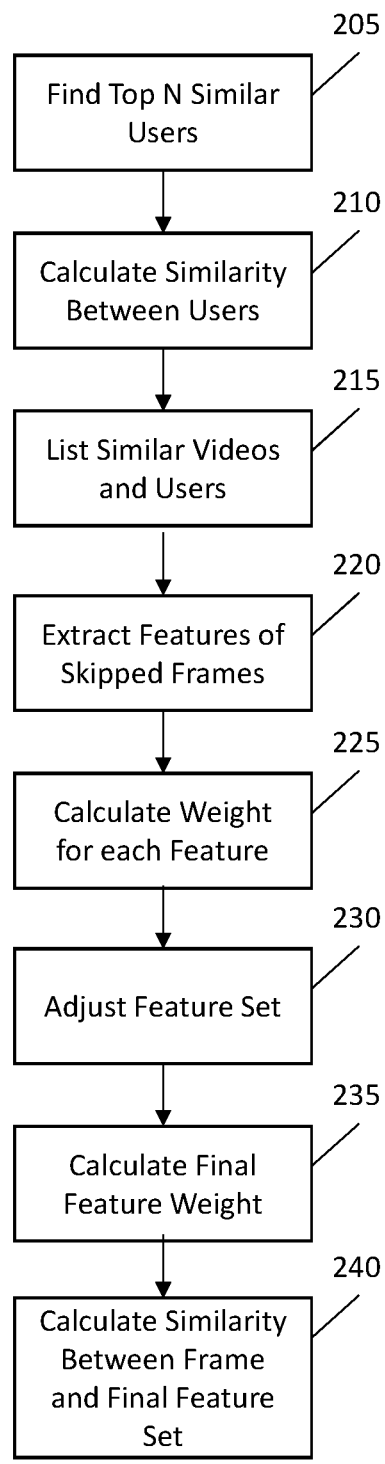
FIG. 2 illustrates an action generation process in accordance with one or more embodiments of the present invention.

FIG. 2 illustrates an action generation process in accordance with one or more embodiments of the present invention. Initially, a video repository is searched to find videos that are similar to the video being watched, with the top similar viewers of the similar videos placed into a table 300 (shown in FIG. 3 and discussed below) (block 205). Similarity among users and among videos can be calculated, for example, using cosine similarity (block 210).

Briefly turning to FIG. 3, FIG. 3 illustrates a table 300 of users and watched videos in accordance with one or more embodiments of the present invention. The table 300 is populated with either a zero or a one in each cell. If a user has not watched a video, a zero is placed in the cell. If a user has watched a video, a one is placed in the cell.

Returning to FIG. 2, a similarity table 400 is created (block 215). FIG. 4 illustrates a similarity table of users and videos in accordance with one or more embodiments of the present invention. If a user has watched a particular video, the similarity between that user and the user currently watching the video is placed in the cell. If a user has not watched a particular video, a zero is place in the cell.

Returning to FIG. 2, features of any frames skipped by the similar users when they were watching the videos are extracted (block 220). The features are extracted by using image recognition technology to recognize the skipped frames and by using semantic analysis to analyze the barrages that users sent when they were watching the videos. FIG. 5 illustrates a feature table 500 of users and watched videos in accordance with one or more embodiments of the present invention. Each cell is populated by a set of features extracted. These features can be, for example, a character, an actor, a scene, a location, and any entities that can be realized from the frame images and barrages.

Returning to FIG. 2, with videos being in rows and features as columns, the weight for each feature for each video is calculated by using the previously calculated user similarity and video similarity as two-factor impact (block 225). The weight for a feature, Feature 1 (F1), is placed in each cell. The general formula is as follows:

$$\text{The weight for } F_j = \Sigma_1{}^i (\tau \text{Similarity}_m) \times S_i, m \leq j, l \leq k,$$

Where similarity is the $\text{Similarity}_m$ between the target user and users who are being analyzed and skip the feature $F_j$.

For example, the weight for F1 may be calculated as (Similarity1+Similarity3)×S1+(Similarity1+Similarity2+Similarity3)×Su. S1 and Su are the similarities between the target video and the videos being analyzed. FIG. 6 illustrates a weighted feature table 600 of users and watched videos in accordance with one or more embodiments of the present invention.

The feature set is adjusted with history data and real-time data of the target user with regards to his skip behavior and barrages for the target video (block 230). F1, the weight for a feature set based on skip behavior and barrages for a target video, has been previously calculated above. An additional weight, F2, is calculated based on image recognition and semantic analysis with the occurrence rate of the feature being used as the additional weight F2. A final feature weight, F, is calculated based on the following formula (block 235):

$$F = (F1 \cap F2) \cup (F1 \cap \overline{F2})$$

The similarity between the frame to be watched and F is used to determine whether the frame should be watched or intelligently skipped for the target user (block 240). Again, cosine similarity is used to calculate similarity.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
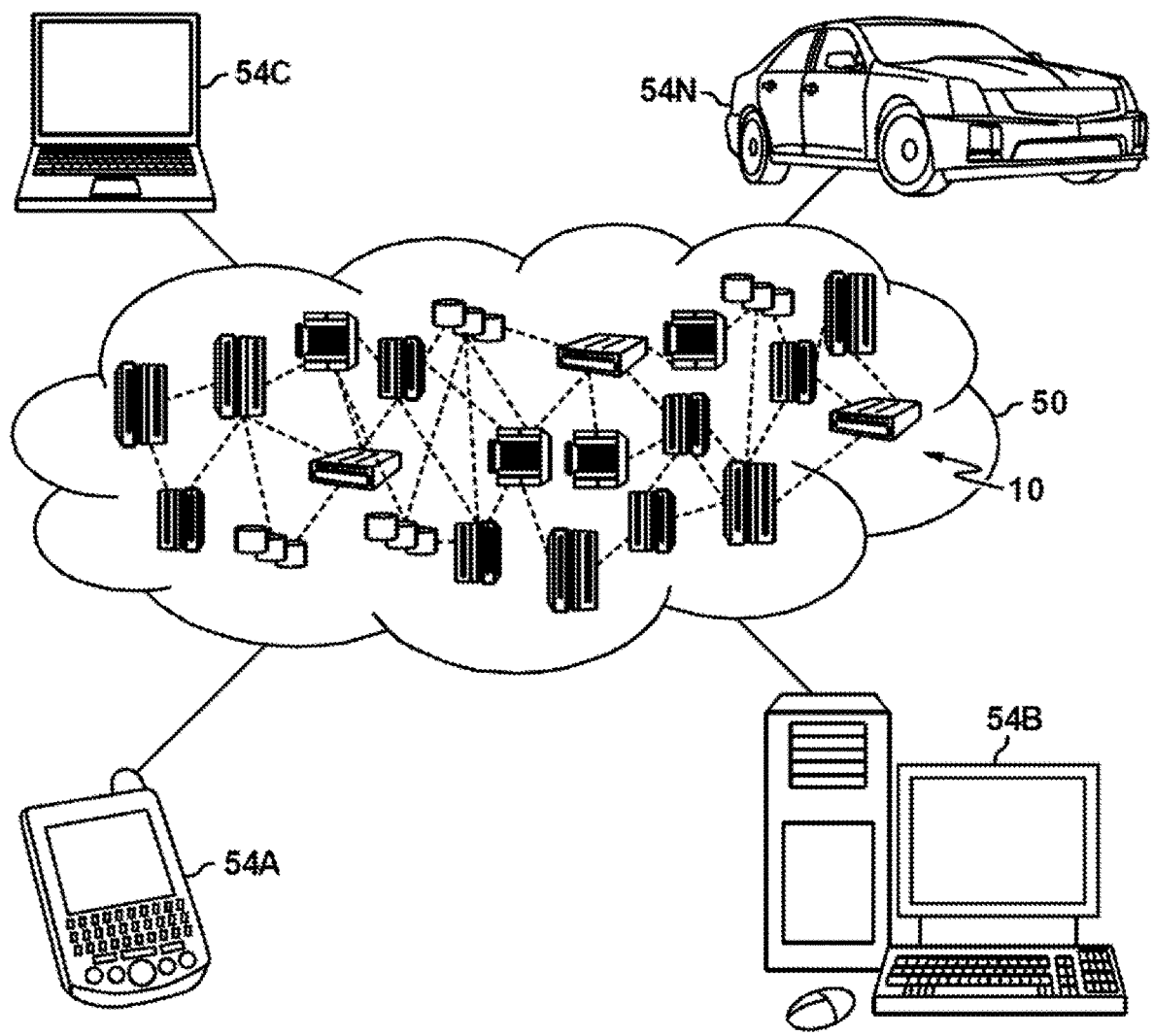
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 8:
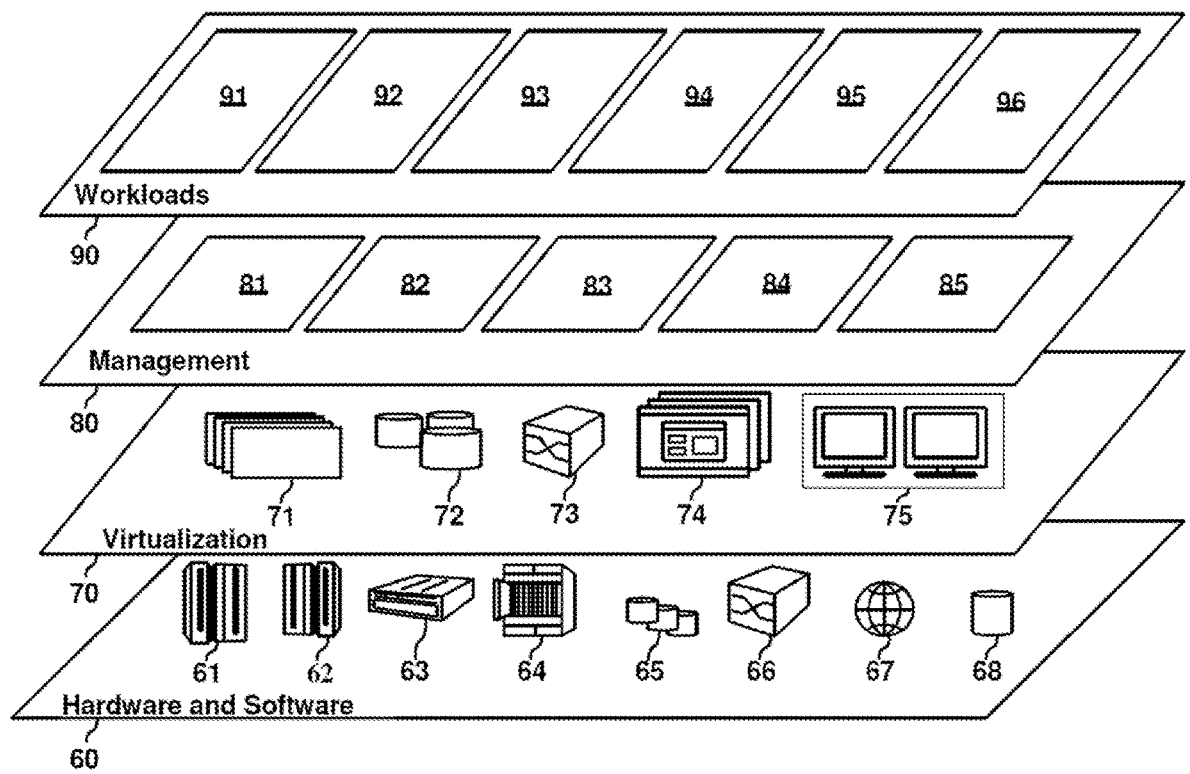
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Secure service container-based virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user be processing 96

Figure 9:
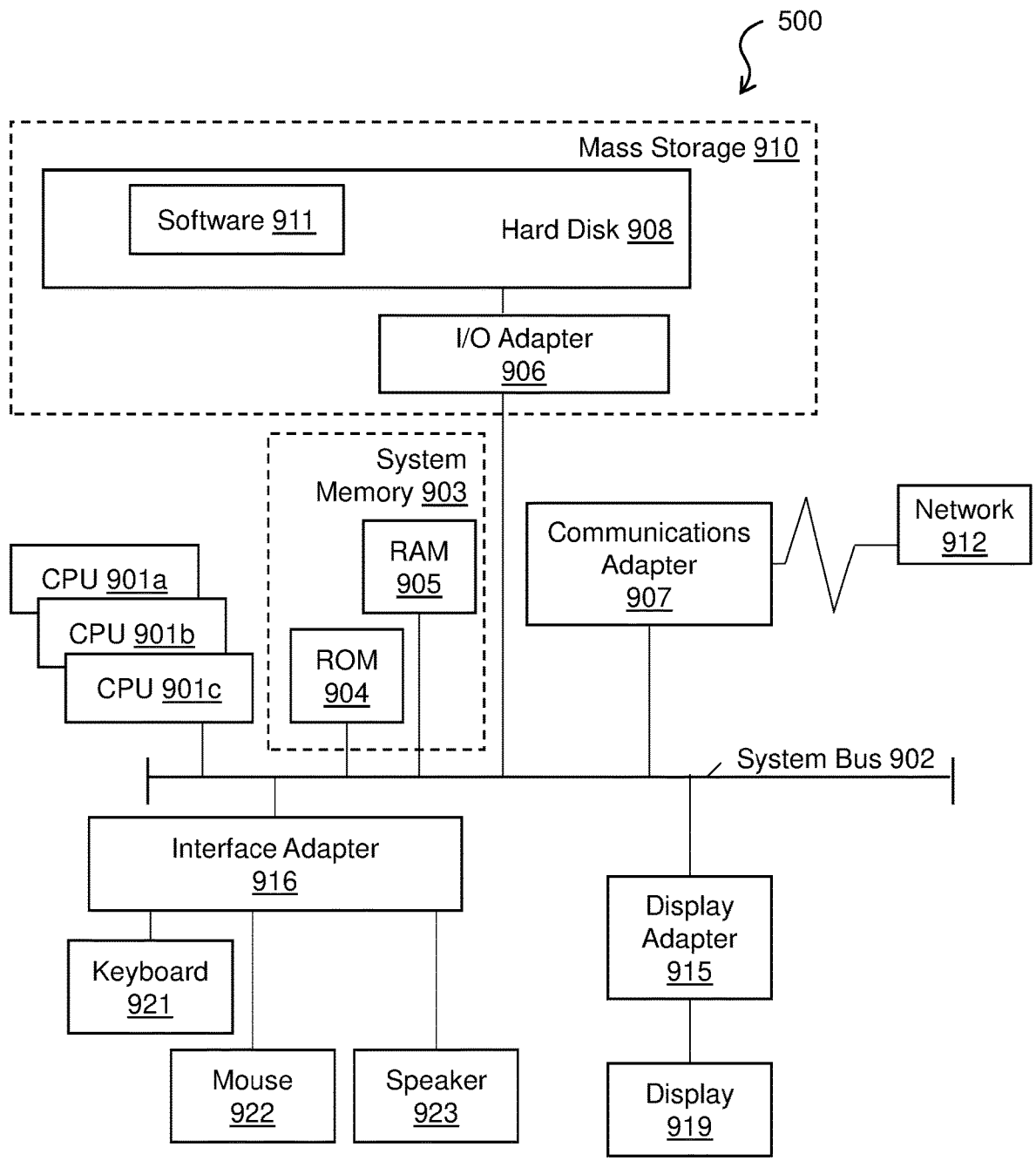
FIG. 9 depicts a computer system in accordance with one or more embodiments of the present invention.

Turning now to FIG. 9, a computer system 900 is generally shown in accordance with an embodiment. The computer system 900 can be an electronic, computer framework comprising and/or employing any number and combination of computing devices and networks utilizing various communication technologies, as described herein. The computer system 900 can be easily scalable, extensible, and modular, with the ability to change to different services or reconfigure some features independently of others. The computer system 900 may be, for example, a server, desktop computer, laptop computer, tablet computer, or smartphone. In some examples, computer system 900 may be a cloud computing node. Computer system 900 may be described in the general context of computer system executable instructions, such as program modules, being executed by a computer system. Generally, program modules may include routines, programs, objects, components, logic, data structures, and so on that perform particular tasks or implement particular abstract data types. Computer system 900 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system 900 has one or more central processing units (CPU(s)) 901a, 901b, 901c, etc. (collectively or generically referred to as processor(s) 901). The processors 901 can be a single-core processor, multi-core processor, computing cluster, or any number of other configurations. The processors 901, also referred to as processing circuits, are coupled via a system bus 902 to a system memory 903 and various other components. The system memory 903 can include a read only memory (ROM) 904 and a random access memory (RAM) 905. The ROM 904 is coupled to the system bus 902 and may include a basic input/output system (BIOS), which controls certain basic functions of the computer system 900. The RAM is read-write memory coupled to the system bus 902 for use by the processors 901. The system memory 903 provides temporary memory space for operations of said instructions during operation. The system memory 903 can include random access memory (RAM), read only memory, flash memory, or any other suitable memory systems.

The computer system 900 comprises an input/output (I/O) adapter 906 and a communications adapter 907 coupled to the system bus 902. The I/O adapter 906 may be a small computer system interface (SCSI) adapter that communicates with a hard disk 908 and/or any other similar component. The I/O adapter 906 and the hard disk 908 are collectively referred to herein as a mass storage 910.

Software 911 for execution on the computer system 900 may be stored in the mass storage 910. The mass storage 910 is an example of a tangible storage medium readable by the processors 901, where the software 911 is stored as instructions for execution by the processors 901 to cause the computer system 900 to operate, such as is described herein below with respect to the various Figures. Examples of computer program product and the execution of such instruction is discussed herein in more detail. The communications adapter 907 interconnects the system bus 902 with a network 912, which may be an outside network, enabling the computer system 900 to communicate with other such systems. In one embodiment, a portion of the system memory 903 and the mass storage 910 collectively store an operating system, which may be any appropriate operating system, such as the z/OS or AIX operating system from IBM Corporation, to coordinate the functions of the various components shown in FIG. 9.

Additional input/output devices are shown as connected to the system bus 902 via a display adapter 919 and an interface adapter 916 and. In one embodiment, the adapters 906, 907, 915, and 916 may be connected to one or more I/O buses that are connected to the system bus 902 via an intermediate bus bridge (not shown). A display 919 (e.g., a screen or a display monitor) is connected to the system bus 902 by a display adapter 915, which may include a graphics controller to improve the performance of graphics intensive applications and a video controller. A keyboard 921, a mouse 922, a speaker 923, etc. can be interconnected to the system bus 902 via the interface adapter 916, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 9, the computer system 900 includes processing capability in the form of the processors 901, and, storage capability including the system memory 903 and the mass storage 910, input means such as the keyboard 921 and the mouse 922, and output capability including the speaker 923 and the display 919.

In some embodiments, the communications adapter 907 can transmit data using any suitable interface or protocol, such as the internet small computer system interface, among others. The network 912 may be a cellular network, a radio network, a wide area network (WAN), a local area network (LAN), or the Internet, among others. An external computing device may connect to the computer system 900 through the network 912. In some examples, an external computing device may be an external webserver or a cloud computing node.

It is to be understood that the block diagram of FIG. 9 is not intended to indicate that the computer system 900 is to include all of the components shown in FIG. 9. Rather, the computer system 900 can include any appropriate fewer or additional components not illustrated in FIG. 9 (e.g., additional memory components, embedded controllers, modules, additional network interfaces, etc.). Further, the embodiments described herein with respect to computer system 900 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    playing, by a processor, a target video with a pre-fetched frame for a target user;
    extracting, by the processor, a feature from the pre-fetched frame, the extracting based at least in part on image recognition applied to the pre-fetched frame and semantic analysis of a barrage comment input by a previous user when watching the target video;
    storing, by the processor, the feature in a repository;
    determining whether a frame of a previously viewed video having the feature was skipped by a previous viewer of the previously viewed video;
    assigning a weight to the feature based at least in part on a similarity of the target user and the previous viewer, and on a similarity of the target video and the previously viewed video;
    providing, by the processor, a plurality of actions to the target user based at least in part on the determining and the weight of the feature;
    receiving, by the processor, one of the plurality of actions from the target user; and
    performing, by the processor, the one of the plurality of actions received from the target user.

2. The computer-implemented method of claim 1, wherein extracting a feature comprises utilizing deep learning.

3. The computer-implemented method of claim 1, further comprising calculating the similarity between the previously viewed video and the target video.

4. The computer-implemented method of claim 1, wherein the determining comprises finding one or more similar users to the target user, the one or more similar users including the previous viewer of the video.

5. The computer-implemented method of claim 1, wherein the providing is further based on history and real-time data about the target user.

6. The computer-implemented method of claim 1, wherein the determining comprises retrieving a feature set for the previously viewed video, the feature set comprising the feature.

7. The computer-implemented method of claim 1, wherein one of the plurality of actions received from the target user includes enabling the target video to skip intelligently to a target anchor with brief verbiage to describe any skipped plot points.

8. A system comprising:
a memory having computer readable instructions; and
one or more processors for executing the computer readable instructions, the computer readable instructions controlling the one or more processors to perform operations comprising:
playing a target video with a pre-fetched frame;
extracting a feature from the pre-fetched frame, the extracting based at least in part on image recognition applied to the pre-fetched frame and sematic semantic analysis of a barrage comment input by a previous user when watching the target video;
storing the feature in a repository;
determining whether a frame of a previously viewed video having the feature was skipped by a previous viewer of the previously viewed video;
assigning a weight to the feature based at least in part on a similarity of the target user and the previous viewer, and on a similarity of the target video and the previously viewed video;
providing a plurality of actions to the target user based at least in part on the determining and the weight of the feature;
receiving one of the plurality of actions from the target user; and
performing the one of the plurality of actions received from the target user.

9. The system of claim 8, wherein extracting a feature comprises extracting using deep learning.

10. The system of claim 8, wherein the operations further comprise calculating a similarity between the previously viewed video and the target video.

11. The system of claim 8, wherein the determining comprises finding one or more similar users to the target user, the one or more similar users including the previous viewer of the video.

12. The system of claim 8, wherein the providing is further based on history and real-time data about the target user.

13. The system of claim 8, wherein the determining comprises retrieving a feature set for the previously viewed video, the feature set comprising the feature.

14. The system of claim 8, wherein one of the plurality of actions received from the target user includes enabling the target video to skip intelligently to a target anchor with brief verbiage to describe any skipped plot points.

15. A computer program product comprising a computer readable storage medium having program instructions embodied therewith, the program instructions executable by a processor to cause the processor to perform operations comprising:
playing a target video with a pre-fetched frame;
extracting a feature from the pre-fetched frame, the extracting based at least in part on image recognition applied to the pre-fetched frame and semantic analysis of a barrage comment input by a previous user when watching the target video;
storing the feature in a repository;
determining whether a frame of a previously viewed video having the feature was skipped by a previous viewer of the previously viewed video;
assigning a weight to the feature based at least in part on a similarity of the target user and the previous viewer, and on a similarity of the target video and the previously viewed video;
providing a plurality of actions to the target user based at least in part on the determining and the weight of the feature;
receiving one of the plurality of actions from the target user; and
performing the one of the plurality of actions received from the target user.

16. The computer program product of claim 15, wherein extracting a feature comprises extracting using deep learning.

17. The computer program product of claim 15, wherein the operations further comprise calculating a similarity between the previously viewed video and the target video.

18. The computer program product of claim 15, wherein the determining comprises finding one or more similar users to the target user, the one or more similar users including the previous view of the video.

19. The computer program product of claim 15, wherein the providing is further based on history and real-time data about the target user.

20. The computer program product of claim 15, wherein the determining comprises retrieving a feature set for the previously viewed video, the feature set comprising the feature.

\* \* \* \* \*